Oct. 12, 1926.
B. H. McDUFFIE
1,603,130
PERCOLATOR URN
Original Filed Feb. 11, 1925   2 Sheets-Sheet 2
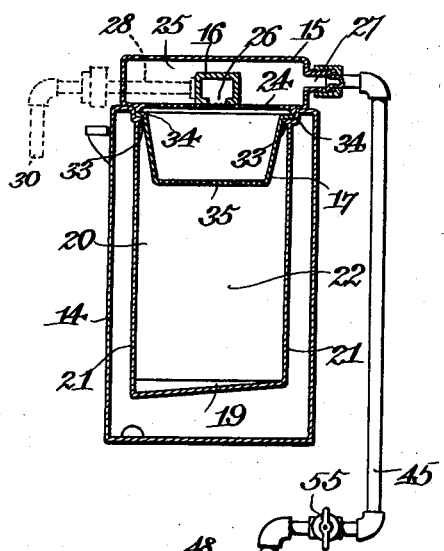
Fig. 4.
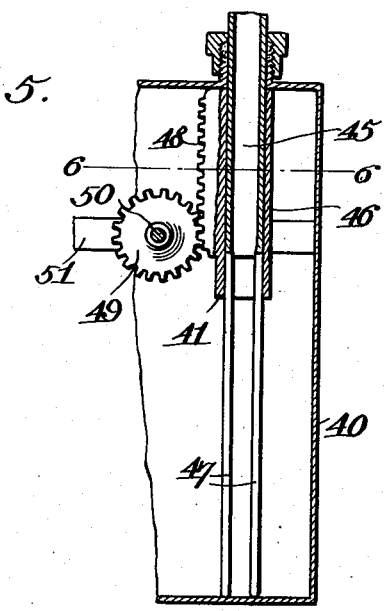
Fig. 5.
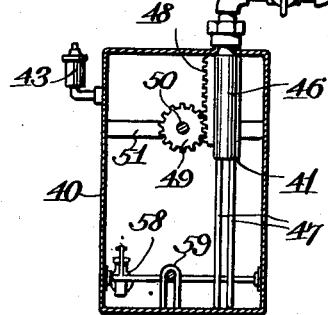
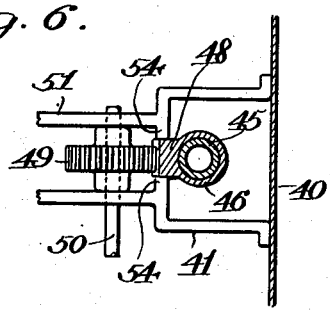
Fig. 6.
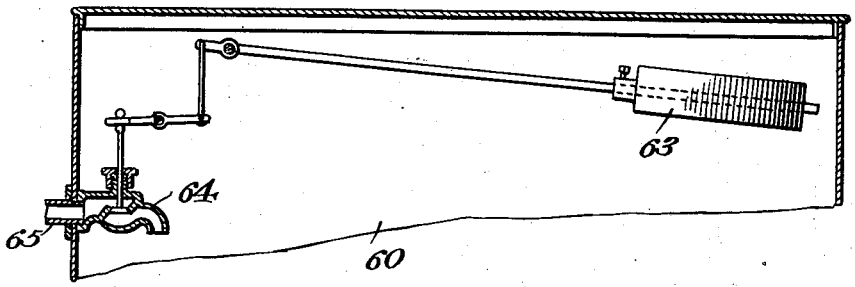
Fig. 7.
WITNESS:
Chris Peinle
INVENTOR,
Benjamin H. McDuffie.
BY Munn & Co
ATTORNEYS.

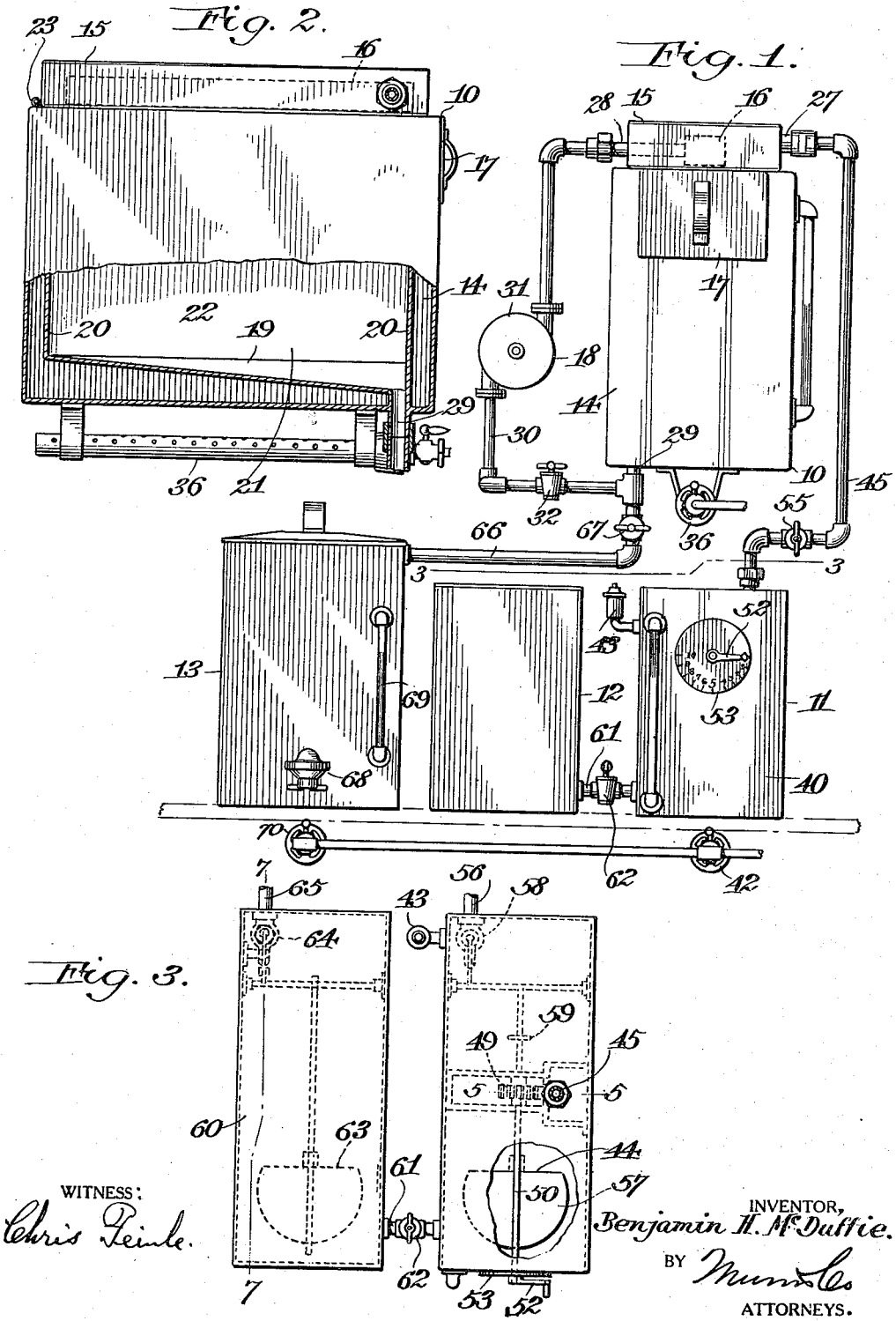

Patented Oct. 12, 1926.

1,603,130

UNITED STATES PATENT OFFICE.

BENJAMIN H. McDUFFIE, OF BROOKLYN, NEW YORK.

PERCOLATOR URN.

Application filed February 11, 1925, Serial No. 8,505. Renewed August 17, 1926.

This invention relates to apparatuses for brewing beverages.

More particularly, the invention relates to coffee brewing or cooking apparatuses of the percolator-urn type.

Some of the objects of the present invention are: to organize a combination of elements into a system for producing a beverage with the minimum of time and labor; to produce an apparatus of the character mentioned especially adapted for use in restaurants, lunch-rooms, and the like; to produce a brewing apparatus with which a coffee beverage may be made in different measured quantities to meet particular demands; to combine with a percolator in which a coffee beverage or the like may be brewed or cooked, a pressure hot water feeder for feeding predetermined charges of hot water to the percolator, and a tank or reservoir for containing the beverage made ready for consumption; to percolate a substance such as ground coffee in the production of a beverage therefrom by circulating the water used in the percolation by virtue of the use of a pump; and to include as a part of the mentioned hot water feeder, means for preventing the same from burning out.

Other objects of the invention will appear as the following specification is read in conjunction with the accompanying drawings, in which—

Figure 1 is a front elevation of the apparatus of the present invention;

Fig. 2 is a sectional side elevation of the percolator of the apparatus;

Fig. 3 is a section on the line 3—3 of Fig. 1, with part of the hot water supply tank broken away to show interior parts;

Fig. 4 is a vertical section through the percolator tank and the hot water supply tank showing several details of the invention;

Fig. 5 is a sectional view on the line 5—5 of Fig. 3;

Fig. 6 is a sectional view on the line 6—6 of Fig. 5, and

Fig. 7 is a fragmentary longitudinal sectional view taken on the line 7—7 of Fig. 3.

The apparatus or system of the present invention, as stated, is especially adapted for brewing a beverage by the percolation process, by utilizing ground coffee and water, and such beverage is commonly known as coffee. The apparatus or system is such that with it the beverage may be made in a minimum of time and with a minimum of labor, at certain intervals as occasion demands, in different measured batches or quantities, and the apparatus or system is therefore of utmost utility in restaurants, lunch rooms, or the like, which dispense comparatively large quantities of coffee.

Generally, the apparatus comprises a percolator 10, a pressure hot water feeder 11, which feeds hot water to the percolator in measured charges or quantities at the will of an operator, a cold water supply means 12 which supplies a predetermined quantity of cold water to the feeder 11, and an urn 13 which receives and contains the beverage produced.

The percolator 10 comprises a water jacketed tank 14, a compartment cover 15 for the top of the tank 14, a spreader 16, a receptacle 17, and circulation means 18. The walls 19, 20, 20 and 21, 21 of the tank 14, define a chamber 22. The cover 15 is hingedly connected as at 23 and is provided with a reticulated bottom 24. The spreader 16 is arranged within the compartment 25 of the cover 15, longitudinally thereof, for a purpose to appear. The spreader 16 is held in place in any suitable manner, such as by soldering, and the same extends substantially the length of the compartment 25 in communication with the chamber 22 by virtue of the opening 26 and the reticulated bottom 24. There is an inlet 27 carried by the cover 15, which communicates with the compartment 25; an inlet 28 carried by the cover 15 which communicates with the interior of the spreader 16 at one end thereof, and an outlet 29 carried by the bottom walls of the tank 14 which communicates with the chamber 22. The bottom 19 inclines toward the outlet 29 which is at one corner of the tank. The means 18 comprises a pipe or conduit 30, one end of which is coupled to the inlet 28, its other end being connected to the outlet 29, a circulation pump 31 being connected in the conduit 30, and a stop valve 32 also being connected in said conduit. The receptacle 17 is in the nature of a drawer and is removably and slidably arranged in the upper part of the tank 14 directly beneath the cover 15 by virtue of companion flanges 33 and 34 carried respectively by the walls 20, 20, and the side walls of the receptacle. The receptacle 17 has a reticulated bottom 39 which establishes communication between the receptacle and the chamber 22 when the receptacle is in place. The receptacle serves for holding the ground coffee to be percolated by the hot water utilized which is fed to the percolator by the feeder 11. A heater 36 is employed in conjunction with the tank.

The feeder 11 comprises a tank 40, measuring and discharging means 41 which is operable to control and measure the discharge of a predetermined quantity of hot water from the tank 40 to the percolator 10, a suitable heater 42 for heating the water within the tank 40, a relief valve 43 for releasing excess pressure within the tank, and means 44 for maintaining a predetermined quantity of water within the tank 40 to prevent the same from burning out upon the failure to put out the heater 42 and were insufficient water in the tank 40. The means 41 comprises a pipe 45 which is secured to the top wall of the tank 40 and extends into said tank and is connected to the inlet 27, a tubular member 46 which surrounds and is slidable on the portion of the pipe 45 within the tank 40 and is also slidable on the parallel guides 47 depending from the pipe 45, a gear rack 48 carried by the member 46, a gear 49 on a shaft 50 rotatably carried by the bracket 51 supported by the side walls of the tank 40, a lever 52 in the nature of a pointer on the external end of the shaft 50 and disposed adjacent a dial 53 carried by the front wall of the tank 40. The member 46 is prevented from having turning movement by virtue of portions 54 of the bracket 51, and maintains the meshing relationship of the gear rack 48 and the gear 49, the portions 54 respectively engaging opposite sides of the rack 48. Cold water is admitted to the tank 40 and rises to a certain level. The water is heated by the heater 42 until it boils and thus creates a pressure within the tank 40. The lower end of the member 46 is slightly above the surface of the water within the tank when at its highest level, and, therefore, the pressure created cannot act to discharge any water through the pipe 45, the pressure existing in a portion of the pipe 45 only because of the stop valve 55 in the pipe, and in the upper part of the tank 40, excess pressure, if any, passing out through valve 43. Upon the lowering of the member 46 to a certain depth in the water by manipulating the lever 52 to a certain point on the dial 53 and by opening the valve 55, a predetermined amount of water will be discharged from the tank 40 through the pipe 45 to the compartment 25. The amount of hot water discharged to the compartment 25 depends upon the depth to which the member 46 is lowered, the pressure within the tank causing the water above the lower end of the pipe 45 to pass into the same until the surface of the water falls below the end of said member 46, whereupon the pressure will be equal in the pipe and the space in the tank above the surface of the water, and as a result the water will cease to discharge. When less than two gallons of water is in the tank 40, the means 44 operates to permit the inflow of water to said tank through the supply pipe 56. The means 44 comprises a float 57 and valve 58 operated by said float, the float being responsive to the rise and fall of the water in the tank when the same is diminished to the extent mentioned, the float being strapped by a strap 59, which is disposed over the rod of the float. The means 44, therefore, serves to maintain a sufficient quantity of water in the tank 40 to prevent the same from burning out.

In order that the supply of water in the tank 40 may be replenished from time to time, and in order that a desired amount of hot water may be discharged from the tank 40 with a certainty, there is provided the means 12. The means 12 comprises a tank 60, a pipe connection 61 between tanks 60 and 40, a valve 62 in said connection 61, coacting float 63 and valve 64, and a water supply pipe 65 connected to the inlet of said valve 64. The float 63 is so arranged in the tank 60 to operate valve 64, and to allow cold water to enter the tanks 60 and 40 until the water is at the same level in both tanks whereupon the float 63 will have risen to a position to effect the closing of the valve 64, the amount of water entering the tank 40 in the present case being substantially ten and one-half gallons.

The urn 15 which receives and contains the beverage produced in the percolator 10 is connected to the outlet 29 of the chamber 22 by a pipe 66 having a valve 67. The urn is provided with a dispensing valve 68 and a gauge glass 69. A heater 70 keeps the beverage in the urn hot.

In practice, the operation of the apparatus is as follows: A supply of ground coffee is placed in the receptacle 17 by removing the same from the tank 40, after which the receptacle is replaced. The ten and one-half gallons of water in the tank 40 has been heated to the boiling point and a pressure has been created in the said tank. The lever 52 is set to the desired point with respect to the dial 53 depending upon the amount of hot water desired for the percolation process. The valve 55 in pipe 45 is then opened whereupon a predetermined quantity of hot water will be discharged from tank 40 through pipe 45 to the compartment 15, thence through the reticulated bottom 24 to percolate the ground coffee, thence through the reticuluated bottom 35 of the receptacle to the chamber 22 of the tank 40. In the meantime, the valve 55 will have been closed. The valve 32 is then opened and the pump 31 is put in operation—the pump being operated by any suitable motive power—whereupon the charge of hot water in the chamber 22 will be circulated so as to pass from the chamber 22, through the conduit 30 and pump 31, and through the inlet 28 to the spreader 16 which spreads or distributes the water over that portion of the bottom 24 at the opening 26. The water then passes through the mentioned portion of the bottom 24 to subject the ground coffee beneath to an extracting or percolating action. The circulation of the water is kept up until the beverage is brewed, after which it may be drawn off by stopping the pump, closing valve 32, and opening valve 67. Another batch or quantity of the beverage may be produced immediately or whenever the occasion demands it by simply repeating the operation described. The tank 40 may be replenished from time to time by simply opening the valve 62.

It will be apparent from the drawings, that the apparatus of the present invention embodies features of construction and arrangement of parts which make the apparatus one very easy to keep clean, which, therefore, insures sanitation.

What is claimed is:

1. An apparatus for producing a beverage from ground coffee and hot water, which comprises means permitting the ground coffee to be percolated by the hot water, water-circulation means for causing the circulation of the water for its percolation of the ground coffee, means for measuring and feeding charges of hot water to the water-circulation means, and for automatically cutting off the flow of hot water and an urn for receiving the beverage produced connected to the first-mentioned means by a valved conduit.

2. A percolator comprising a tank having a chamber, a cover hingedly connected to said tank, the walls of said cover defining a compartment and one of said walls being reticulated, a spreader within said compartment opened over said reticulated wall of the cover, said cover carrying an inlet which communicates with the spreader and an inlet which communicates with the compartment and connected to a water supply source, an outlet communicating with said chamber, a receptacle having a reticulated bottom removably arranged in said tank beneath said compartment and spreader, and removable through a side of the tank, a conduit connected to the outlet communicating with said chamber and connected to said inlet communicating with said spreader, and a circulation pump connected in said conduit.

3. A percolator comprising a water jacketed tank having an inlet and an outlet, a receptacle slidably and removably arranged in the upper part of said tank and removable through a side of the tank, said receptacle having a reticulated bottom and serving for holding ground coffee to be percolated to produce a beverage by virtue of the use of water admitted to said tank, and a conduit whose inlet opens over said receptacle and whose outlet is in communication with the interior of said tank.

4. A percolator comprising a jacketed tank having at the top thereof a compartment with a reticulated bottom, said tank having an inlet and an outlet; a receptacle slidably and removably arranged in the upper part of said tank beneath said compartment and removable through a side of the tank, said receptacle having a reticulated bottom and serving for holding ground coffee to be percolated to produce a beverage by virtue of the use of water admitted to said tank, means in communication with said compartment and with the interior of said tank for effecting a circulation of the water in the production of the beverage from the ground coffee and water, and a heater arranged beneath said tank for heating the beverage.

5. A percolator comprising a tank having an inlet and an outlet, a receptacle within said tank for holding a substance to be percolated to produce a beverage or brew by the use of a liquid such as water admitted to the tank, said receptacle consisting of a reticulated drawer removable through a side of the tank, and means in communication with the receptacle and the interior of said tank for effecting a circulation of the liquid in the production of the beverage or brew from said substance and water.

6. A percolator for brewing a beverage by virtue of the use of ground coffee and hot water, and in combination, a pressure hot water feeder connected to said percolator by a valved feed pipe for feeding hot water to said percolator, said pressure hot water feeder comprising a tank having a feed pipe leading to the interior thereof through which cold water is fed to said tank, and a discharge regulator operable to measure and to permit the discharge of a predetermined quantity of hot water from said tank through said feed pipe connected to said percolator, said discharge regulator including coacting measuring tubes, one of which is connected to said last-mentioned feed pipe.

7. A percolator for brewing a beverage by virtue of the use of ground coffee and hot water, and in combination, a pressure hot water feeder connected to said percolator by a valved feed pipe for feeding hot water to said percolator, said pressure hot water feeder comprising a tank having a feed pipe leading to the interior thereof through which cold water is fed to said tank, and a discharge regulator operable to permit the discharge of a predetermined quantity of hot water from said tank through said feed pipe connected to said percolator, said discharge regulator including coacting telescopically related measuring tubes one of which is connected to said last mentioned feed pipe.

8. A percolator for brewing a beverage by virtue of the use of ground coffee and hot water, and in combination, a pressure hot water feeder connected to said percolator by a valved feed pipe for feeding hot water to said percolator, said pressure hot water feeder comprising a tank having a feed pipe leading to the interior thereof through which cold water is fed to said tank, a discharge regulator operable to permit the discharge of a predetermined quantity of hot water from said tank through said feed pipe connected to said percolator, said discharge regulator including coacting measuring tubes, one of which is connected to said last-mentioned feed pipe, and means for effecting the movement of one of said tubes with relation to the other in the measuring operation.

9. A percolator for brewing a beverage by virtue of the use of ground coffee and hot water, and in combination, a pressure hot water feeder connected to said percolator by a valved feed pipe for feeding hot water to said percolator, said pressure hot water feeder comprising a tank having a feed pipe leading to the interior thereof through which cold water is fed to said tank, a discharge regulator operable to permit the discharge of a predetermined quantity of hot water from said tank through said feed pipe connected to said percolator, said discharge regulator comprising coacting measuring tubes, one of which is connected to said last-mentioned feed pipe, and means for effecting the movement of one of said tubes with relation to the other in the measuring operation, said means comprising a gear rack carried by said movable tube, a gear in mesh with said gear rack, and a device for turning said gear.

10. A percolator for brewing a beverage by virtue of the use of ground coffee and hot water, and in combination, a pressure hot water feeder for feeding a predetermined quantity of hot water to said percolator, said pressure hot water feeder including a tank which contains the hot water; and apparatus for introducing a predetermined amount of water to said tank, said apparatus including a reservoir in communication with said tank, and means for admitting a certain amount of water to said reservoir, and means for maintaining a minimum amount of water in said tank.

BENJAMIN H. McDUFFIE.